United States Patent
Ichimura

(10) Patent No.: US 9,218,706 B2
(45) Date of Patent: Dec. 22, 2015

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventor: Ryutaro Ichimura, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 443 days.

(21) Appl. No.: 13/687,394

(22) Filed: Nov. 28, 2012

(65) Prior Publication Data

US 2013/0137514 A1 May 30, 2013

(30) Foreign Application Priority Data

Nov. 30, 2011 (JP) ................................. 2011-263140

(51) Int. Cl.
| | |
|---|---|
| A63F 9/24 | (2006.01) |
| A63F 13/00 | (2014.01) |
| G07F 17/32 | (2006.01) |
| G05G 5/00 | (2006.01) |
| G05G 5/28 | (2006.01) |

(Continued)

(52) U.S. Cl.
CPC ............ *G07F 17/3209* (2013.01); *A63F 13/06* (2013.01); *A63F 13/08* (2013.01); *G05G 5/005* (2013.01); *G05G 5/28* (2013.01); *G07F 17/3211* (2013.01); *A63F 2300/1043* (2013.01); *A63F 2300/1062* (2013.01); *A63F 2300/6036* (2013.01)

(58) Field of Classification Search
CPC ........... A63F 13/803; A63F 2300/1062; A63F 13/90; A63F 13/80; A63F 13/92; A63F 13/98; A63F 13/08
See application file for complete search history.

(56) References Cited

U.S. PATENT DOCUMENTS 3,008,712 A * 11/1961 Konopka ...................... 273/445
4,102,532 A *  7/1978 Van Jepmond et al. ........... 463/5
(Continued)

FOREIGN PATENT DOCUMENTS

| EP | 1863260 | 12/2007 |
|---|---|---|
| JP | 2001-347074 | 12/2001 |
| JP | 2006-068197 | 3/2006 |

OTHER PUBLICATIONS

"Night Stocker", source http://www.arcade-museum.com/game_detail.php?game_id=8870. Release date 1986.*

(Continued)

*Primary Examiner* — Steven J Hylinski
(74) *Attorney, Agent, or Firm* — Greenblum & Bernstein, P.L.C.

(57) ABSTRACT

A video game processing apparatus is provided. Game information on first and second game modes for a video game is stored in a game information memory. In a case where a video game start request is received, progress of the video game in a first game mode is controlled in accordance with an instruction inputted using a first controller. A player is induced to carry out a game mode shifting operation in a case where it is determined that predetermined conditions are satisfied. A second controller is caused to move from a storage state to an exposed state in a case where the game mode shifting operation is received. Progress of the video game in the second game mode is controlled in accordance with an instruction inputted using the second controller in a case where the second controller is caused to move to the exposed state.

14 Claims, 11 Drawing Sheets

(51) Int. Cl.
*A63F 13/20* (2014.01)
*A63F 13/90* (2014.01)

(56) References Cited

U.S. PATENT DOCUMENTS

| | | | |
|---|---|---|---|
| 4,948,371 A * | 8/1990 | Hall | 434/21 |
| 5,594,618 A * | 1/1997 | Sellers | 361/679.55 |
| 5,704,837 A * | 1/1998 | Iwasaki et al. | 463/38 |
| 6,626,762 B1 * | 9/2003 | Yabushita et al. | 463/49 |
| 6,826,042 B2 | 11/2004 | Oross et al. | |
| 6,920,041 B2 | 7/2005 | Oross et al. | |
| 7,092,747 B2 | 8/2006 | Park et al. | |
| 7,846,027 B2 | 12/2010 | Meyer | |
| 8,231,466 B2 | 7/2012 | Tokita et al. | |
| 2002/0010021 A1 * | 1/2002 | McCauley | 463/37 |
| 2003/0206151 A1 | 11/2003 | Oross et al. | |
| 2005/0063153 A1 | 3/2005 | Oross et al. | |
| 2005/0090298 A1 | 4/2005 | Park et al. | |
| 2007/0293316 A1 | 12/2007 | Meyer | |
| 2008/0293472 A1 * | 11/2008 | Strawn et al. | 463/16 |
| 2011/0172013 A1 | 7/2011 | Shirasaka et al. | |
| 2011/0276879 A1 | 11/2011 | Ando et al. | |

OTHER PUBLICATIONS

Office Action from European Patent Office (EPO) in European Patent Application No. 12194687.5, dated Apr. 11, 2014.
Extended European Search Report from European Patent Office in European Patent Application No. 12194687.5, dated Mar. 14, 2013.
"Telescopic Joystick", IBM Technical Disclosure Bulletin, International Business Machines Corp. (Thornwood), US, vol. 31. No. 11, XP000052233, pp. 288-289 (Apr. 1, 1989).

* cited by examiner

Fig.5

CHARACTER INFORMATION

| CHARACTER ID | FIRST GAME MODE | | SECOND GAME MODE | | |
|---|---|---|---|---|---|
| | DRIVING FORM INFORMATION | DRIVING PERFORMANCE INFORMATION | ROBOT FORM INFORMATION | BATTLE PERFORMANCE INFORMATION | TECHNIQUE (ACTION CARRIED OUT IN ACCORDANCE WITH BATTLE COMMAND) |
| 001 | VEHICLE | ACCELERATION PERFORMANCE 1 GRIP PERFORMANCE 1 ... | ... HUMANOID ROBOT | OFFENSIVE POWER 1 DEFENSIVE POWER 2 SPEED 1 | NORMAL ATTACK BURST ATTACK COUNTER ATTACK ...... |
| 002 | ...... | ...... | ...... | ...... | ...... |
| 003 | ...... | ...... | ...... | ...... | ...... |
| ... | ... | ... | ... | ... | ... |

Fig.6

CORRELATION INFORMATION OF "TECHNIQUE" CONTAINED IN SECOND GAME MODE INFORMATION

| | ENEMY,NORMAL ATTACK | ENEMY,BURST ATTACK | ENEMY,COUNTER ATTACK |
|---|---|---|---|
| PLAYER,NORMAL ATTACK | PLAYER NORMAL ATTACK ACTIVATION ENEMY NORMAL ATTACK ACTIVATION | PLAYER NORMAL ATTACK ACTIVATION ENEMY BURST ATTACK ACTIVATION | PLAYER NORMAL ATTACK ACTIVATION ENEMY COUNTER FAILURE |
| PLAYER,BURST ATTACK | PLAYER BURST ATTACK ACTIVATION ENEMY NORMAL ATTACK ACTIVATION | PLAYER BURST ATTACK ACTIVATION ENEMY BURST ATTACK ACTIVATION | PLAYER ACTION IMPOSSIBLE ENEMY BURST BREAK ACTIVATION |
| PLAYER,COUNTER ATTACK | PLAYER COUNTER FAILURE ENEMY NORMAL ATTACK ACTIVATION | PLAYER BURST BREAK ACTIVATION ENEMY ACTION IMPOSSIBLE | PLAYER COUNTER FAILURE ENEMY COUNTER FAILURE |

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2011-263140, filed on Nov. 30, 2011, the disclosure of which is expressly incorporated herein by reference in its entirety.

BACKGROUND OF THE INVENTION

1. Field of the Invention

The present invention relates to a technique for controlling progress of a video game including a match-up with (or a battle against) an enemy character by displaying a player character operated by a player on a display screen, and particularly, the present invention relates to a technique for controlling progress of a video game suitable to an arcade game.

2. Description of the Related Art

Various kinds of arcade game apparatuses have been proposed that are installed in a public space such as a video game arcade, and the arcade game apparatuses are used in the public space.

Japanese Patent Application Publication No. 2006-068197 (hereinafter, referred to as "Patent Literature 1") discloses that progress of a video game is up the tempo (or accelerated) by allowing a player to carry out a selection operation only in an important scene in such an arcade game apparatus.

Patent Literature 1 raises a problem that a play time becomes elongated depending upon judgment or determination of a player and decision of the player does not reflect a video game result at all in a sports game that includes a "reproduction mode" in which a result of actual sports such as professional baseball is reproduced as an animated film and a "simulation mode" in which the player run the show as a coach (see Japanese Patent Application Publication No. 2001-347074). Further, Patent Literature 1 discloses that a coin-operated (professional-use) match-up simulation game machine causes a simulation game (video game) to automatically proceed in accordance with a video game program; suspends (or stops temporarily) progress of the video game when to reach an important scene that a progress status of the video game satisfies a predetermined condition; allows the player to alternatively select a course on the progress of the video game during a suspended period of time; and restarts the simulation game in response to the course selection by the player. By configuring the video game in such a manner, the problem that has occurred in the prior art is solved by Patent Literature 1.

However, in the arcade game apparatus described above, a creator of the video game requests an instruction by the player in a scene that the creator thinks as a "scene highly influencing future development of the video game". For that reason, variation of the content of the video game has limitations. Further, there has been a problem that interest of the player, who thinks that the video game is caused to proceed by operating a controller or the like by oneself as much as possible, in progress of the video game may wane if there is no choice such as whether the video game is set to automatic progress or not.

SUMMARY OF THE INVENTION

The present invention has been made in order to solve the problems described above, and it is an object of the present invention to provide a match-up type video game with rich variation, which can keep interest of a player in the video game.

In order to achieve the above objects, the present invention is directed to a video game processing apparatus for controlling progress of a video game by displaying an operational object operated by a player on a display screen. In this case, the progress of the video game contains a fight against an enemy character. The video game processing apparatus according to the present invention includes a game information memory for storing game information on a first game mode and a second game mode for the video game, the second game mode being a game mode different from the first game mode.

The video game processing apparatus also includes a video game start request receiver for receiving a video game start request from the player.

The video game processing apparatus also includes a first controller for controlling progress of the video game in the first game mode in accordance with an instruction inputted using a first controller in a case where the video game start request receiver receives the video game start request.

The video game processing apparatus also includes a first determiner for determining whether a predetermined condition is satisfied or not.

The video game processing apparatus also includes a game mode shifting operation inducing informer for inducing the player to carry out a game mode shifting operation in a case where the first determiner determines that the predetermined condition is satisfied, the game mode shifting operation being an operation set up as an operation to shift a game mode.

The video game processing apparatus also includes a game mode shifting operation receiver for receiving the game mode shifting operation by the player.

The video game processing apparatus also includes a second controller mover for causing a second controller to move from a storage state to an exposed state in a case where the game mode shifting operation receiver receives the game mode shifting operation.

The video game processing apparatus also includes a second controller for controlling progress of the video game in the second game mode in accordance with an instruction inputted using the second controller in a case where the second controller mover causes the second controller to move to the exposed state.

By configuring it as described above, it is possible to provide a match-up type video game with rich variation, which can keep interest of a player in the video game.

In the video game processing apparatus according to the present invention, it is preferable that the game mode shifting operation is an operation to cause a position of the first controller to move to a predetermined evacuation position, the predetermined evacuation position not lying in the way when to operate the second controller.

In the video game processing apparatus according to the present invention, it is preferable that the first controller has a steering shape; the first game mode is a drive mode in which the player operates a vehicle; the second controller is a lever-shaped controller provided with a trigger; and the second game mode is a battle mode in which a robot operated by the player carries out a battle against the enemy character.

In the video game processing apparatus according to the present invention, it is preferable that the video game processing apparatus further includes: an operational object information memory for storing operational object information, the operational object information containing information regarding at least one kind of the operational object, the information indicating a form in the first game mode and a form in the second game mode; a card information receiver for receiving an input of card information, the card information containing identification information of the operational object; an operational object specifier for specifying an operational object as an operational object of the player in each of the game modes on the basis of the card information received by the card information receiver, the operational object indicating a predetermined number of pieces of operational object information among the operational object information stored in the operational object information memory; and an operational object display controller for displaying the operational object specified by the operational object specifier on the display screen with a form according to each of the game mode, wherein the second controller includes a reflector that reflects a result of progress of the video game in the first game mode to progress of the video game in the second game mode.

In the video game processing apparatus according to the present invention, it is preferable that the game information contains correlation information that is information indicating the content of a process to be carried out in accordance with a combination of an instruction that can be inputted using the second controller in the second game mode and the content that can be instructed to the enemy character; and the second controller includes a process content determiner for referring to the correlation information to determine the content of a process carried out in accordance with the instruction inputted using the second controller.

Moreover, in another aspect of the present invention, the present invention is directed to a video game processing program product for controlling progress of a video game by displaying an operational object operated by a player on a display screen, the progress of the video game including a fight against an enemy character. The video game processing program according to the present invention causes a computer to execute steps including receiving a video game start request from the player.

The steps also include controlling progress of the video game in a first game mode on the basis of game information stored in a game information memory in accordance with an instruction inputted using a first controller in a case where the video game start request is received in the receiving a video game start request, the game information being related to the first game mode and a second game mode of the video game, the second game mode being a game mode different from the first game mode.

The steps also include determining whether a predetermined condition is satisfied or not.

The steps also include inducing the player to carry out a game mode shifting operation in a case where it is determined that the predetermined condition is satisfied in the determining whether a predetermined condition is satisfied, the game mode shifting operation being an operation set up as an operation to shift the game mode.

The steps also include receiving the game mode shifting operation by the player.

The steps also include causing a second controller to move from a storage state to an exposed state in a case where the game mode shifting operation is received in the receiving the game mode shifting operation.

The steps also include controlling progress of the video game in the second game mode on the basis of the game information in accordance with an instruction inputted using the second controller in a case where the second controller is cased to move to the exposed state.

According to the present invention, it is possible to provide a match-up type video game with rich variation, which can keep interest of a player in the video game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 5 is an explanatory drawing showing an example of a storage state of character information;

FIG. 6 is an explanatory drawing showing an example of a storage state of second game mode information;

DETAILED DESCRIPTION OF THE INVENTION

Hereinafter, one embodiment of the present invention will be described with reference to the appending drawings.

Figure 1:
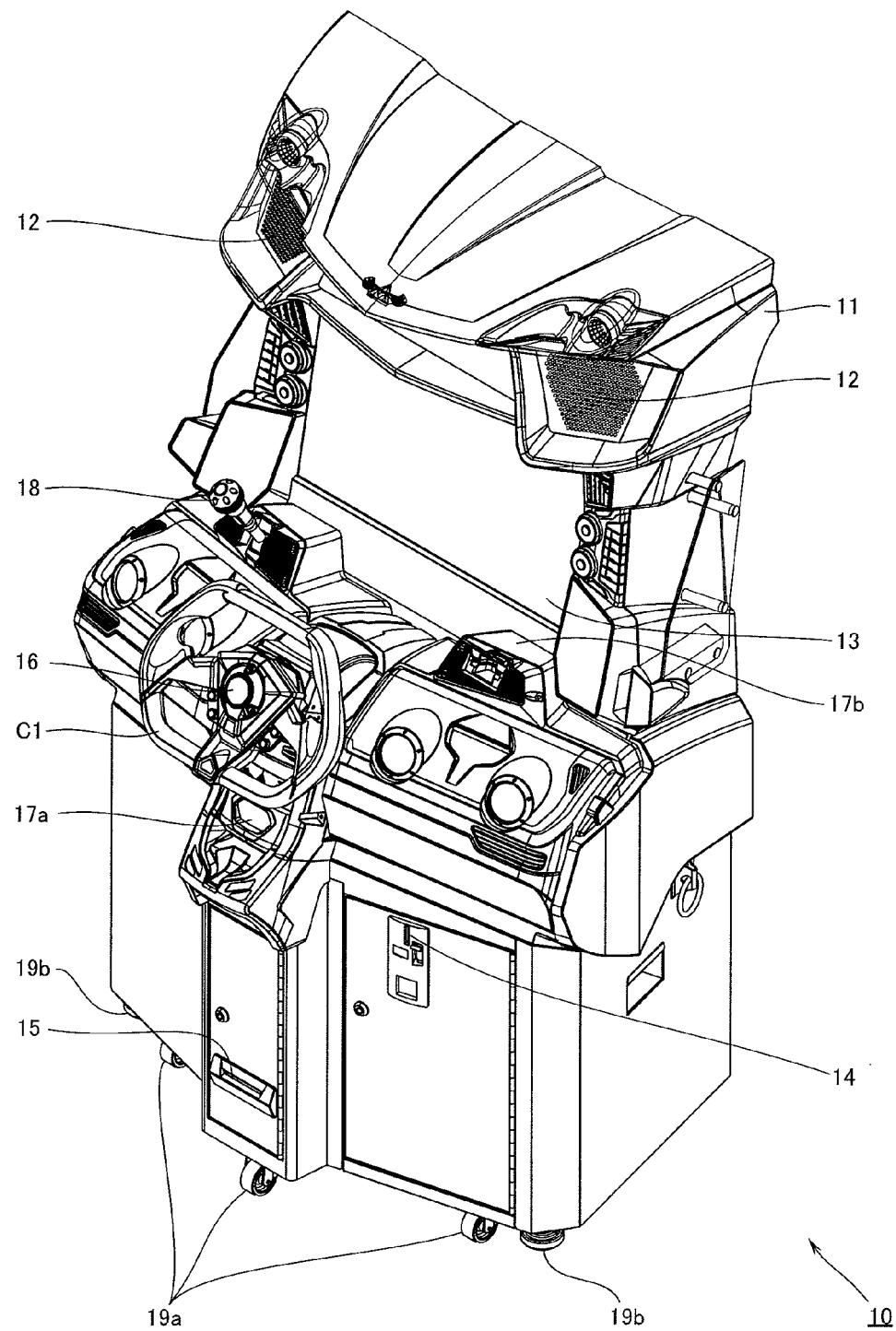
FIG. 1 is a configuration diagram showing an example of an appearance configuration of an arcade video game machine (arcade game apparatus)

FIG. 1 is a configuration diagram showing an example of an appearance configuration of an arcade video game machine (arcade game apparatus) 10 according to one embodiment of the present invention. As shown in FIG. 1, in the arcade video game machine 10, two speakers 12 for outputting an audio and a display device 13 for displaying an image are arranged on a front and upper portion of a housing 11. The display device 13 is configured by a CRT, a liquid crystal display or the like. A coin slot 14 into which a coin for starting a video game is dropped and a card discharge port 15 for discharging a card for the video game (will be described later, hereinafter, referred to simply as a "card") to the outside are arranged on a front and lower portion of the housing 11.

There is a controller arrangement region in which various kinds of controllers are arranged between the display device 13 and the coin slot 14. A steering type controller C1 that is a steering-shaped controller is arranged substantially in the center of the controller arrangement region. Further, a player operation button 16 is arranged substantially in the center of the steering type controller C1 (that is, arranged at a portion in which a klaxon is arranged in a handle of a general vehicle). Moreover, a bar-shaped controller (shift lever) 18 is arranged at an upper side of the steering type controller C1. Both the steering type controller C1 and the shift lever 18 are mainly used when a player plays a first game mode (will be described later) among video games played in the arcade video game machine 10. Namely, both the steering type controller C1 and the shift lever 18 are mainly operated in order to cause a video game of the first game mode to proceed. Hereinafter, the steering type controller C1 is called a "steering C1" arbitrarily.

A scanner 17a provided with a card insertion slot (will be described later) for inserting a card is arranged at a lower portion of the controller arrangement region. The scanner 17a reads out code data written on a card inserted in the card insertion slot.

Further, a scanner 17b provided with a card insertion slot for inserting a card on which user information is registered is arranged above the controller arrangement region and at substantially the reverse side of a position of the shift lever 18 with respect to the steering type controller C1. The scanner 17b reads out the user information described on the card inserted into the card insertion slot. In this regard, the scanner 17a and the scanner 17b may be configured by one scanner.

Further, a plurality of casters 19a are provided on a bottom surface of the housing 11. The casters 19a make it possible to move the arcade video game machine 10 readily. An adjuster 19b for adjusting a height of the arcade video game machine 10 is arranged at the front side of the bottom surface of the housing 11. The adjuster 19b allows the arcade video game machine 10 to be installed regardless of a concave-convex shape of an installation place. Moreover, a shield case 20 (not shown in the drawings) is arranged inside the housing 11. A substrate on which a control circuit is mounted and the like are stored in the shield case 20.

Next, a physical action of the arcade video game machine 10 will be described.

Figure 2:
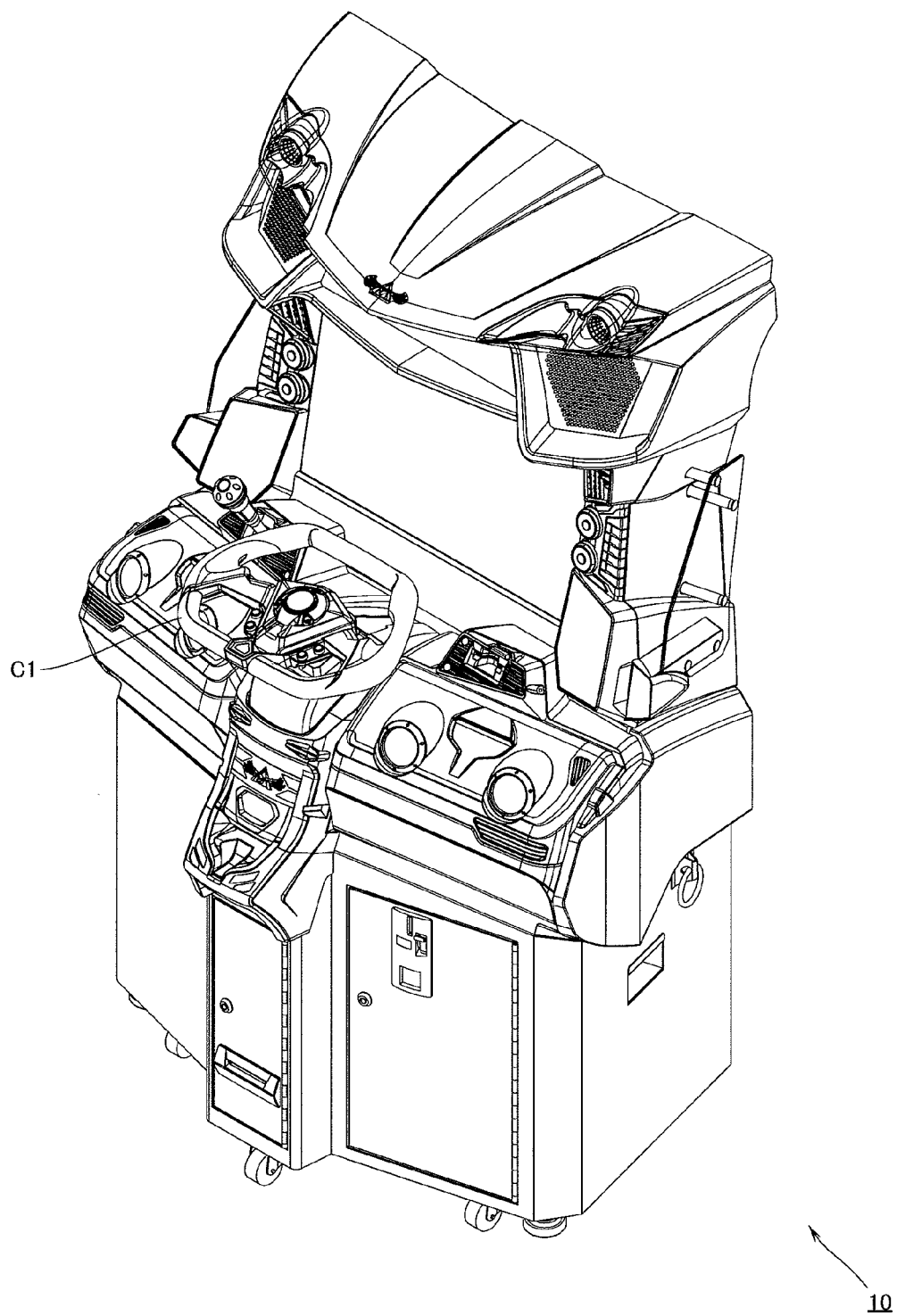
FIG. 2 is a configuration diagram showing an example of another appearance configuration of the arcade video game machine.

FIG. 2 is a configuration diagram showing an appearance configuration of the arcade video game machine 10 when a position (or posture) of the steering type controller C1 is changed by the player, for example. As shown in FIG. 2, the steering type controller C1 is configured so that an angle of root portion thereof can be changed. In this regard, in the present embodiment, the steering type controller C1 is locked (or fixed) until a predetermined condition I satisfied. In a case where the predetermined condition I satisfied, the lock of the steering type controller C1 is released, and this makes it possible to change its position (or posture). In this regard, the arcade video game machine 10 may be configured so that the position change of the steering type controller C1 does not rely on a human power, or a mechanism to assist a human power is provided. Further, in a case where the steering type controller C1 is moved to a predetermined position (evacuation position), the steering type controller C1 is locked at the spot (or with the posture). In the present embodiment, a position of the steering type controller C1 in the arcade video game machine 10 is controlled by means of a steering type controller driving section CD1 (not shown in the drawings).

Figure 3:
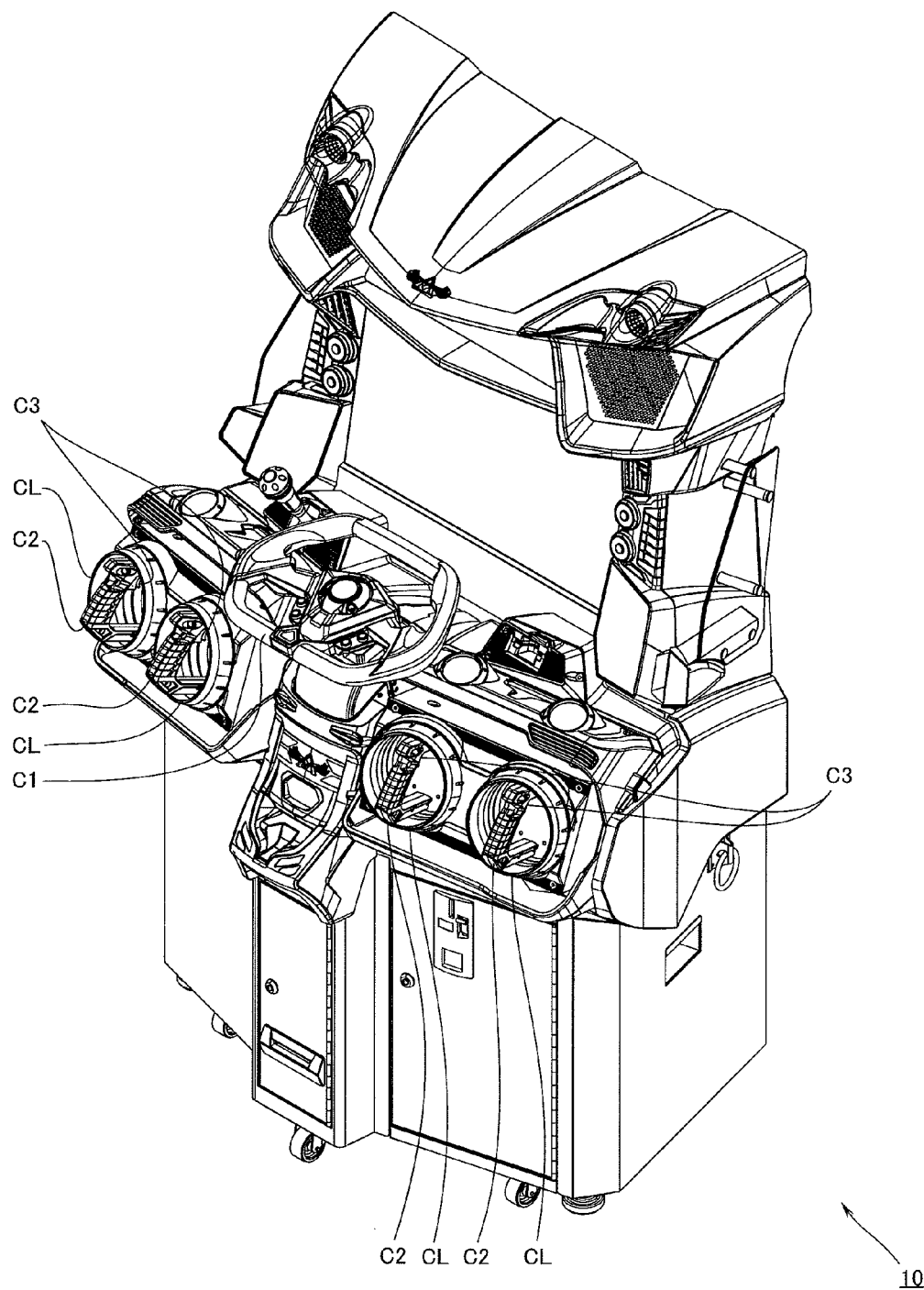
FIG. 3 is a configuration diagram showing an example of still another appearance configuration of the arcade video game machine.

FIG. 3 is a configuration diagram showing an appearance configuration of the arcade video game machine 10 when the steering type controller C1 is moved to a predetermined position (in the present embodiment, the position shown in FIG. 2) and a lever type controller C2 thereby appears. As shown in FIG. 3, as the lever type controllers C2, four controllers (lever-shaped controller or lever type controller) C2 are arranged two by two at both sides of the steering type controller C1. Each of the lever type controllers C2 has a handle (or grip) with a size as much as a person can grab in one hand. In this regard, in the present embodiment, a frame CL is provided around each of the lever type controllers C2, and each of the lever type controllers C2 is configured so as to be capable of rotating along the frame CL. Further, a trigger type controller C3 is provided on each of the lever type controllers C2. The lever type controller C2 and the trigger type controller C3 are mainly used when the player plays a second game mode (will be described later) in the video game played in the arcade video game machine 10. Namely, the lever type controller C2 and the trigger type controller C3 are mainly operated in order to cause the video game in the second game mode to proceed. Hereinafter, in some cases, the lever type controller C2 is called a "gyro lever C2", and the trigger type controller C3 is called a "trigger C3". In this regard, the lever type controller C2 may be configured so as not to be capable of rotating, and may be configured so that an instruction by the player can be inputted.

In this regard, in a case where two players fight against each other using one arcade video game machine 10, one player first carries out the video game by a drive mode using the steering type controller C1, and the other player then carries out the video game by the drive mode using the steering type controller C1. After the video game by the drive mode is carried out by the two players, the two players carry out the video game by a battle mode based on the results using the two gyro levers C2 for each player.

The lever type controller C2 is caused to move, by means of a lever type controller driving section CD2 (not shown in the drawings), from an initial position (as shown in FIG. 1, the position at which the player cannot operate; that is, the position at which the lever type controller C2 does not appear) to a specific position (as shown in FIG. 3, the position at which the player can operate; that is, the position at which the lever type controller C2 appears), in a case where a position of the steering type controller C1 becomes a state (the state shown in FIGS. 2 and 3) moved upward from an arrangement at the start of the video game (the state shown in FIG. 1) when a condition (will be described later) is satisfied during progress of the video game.

More specifically, in the state shown in FIG. 1, the lever type controller C2 is stored inside the arcade video game machine 10. In a case where the steering type controller C1 is held up (in a case where the steering type controller C1 becomes the state shown in FIG. 2), a part of the arcade video game machine 10 is driven, and the lever type controllers C2 are caused to move forward. Namely, in the present embodiment, each of the lever type controllers C2 is configured so as to be capable of moving from a storage state to an exposed state. In this regard, a method of driving the two kinds of controllers is not limited to this. The arcade video game machine 10 may be configured so that, in a case where a first controller is moved to a position at which the player cannot operate the first controller (or inconvenience position), a second controller is moved to a position at which the player can operate the second controller (or convenience position). Further, in the present embodiment, the arcade video game machine 10 is configured so that each of the controllers C1, C2 is returned to an initial position when the video game is terminated.

Next, an internal configuration of the arcade video game machine 10 will be described.

Figure 4:
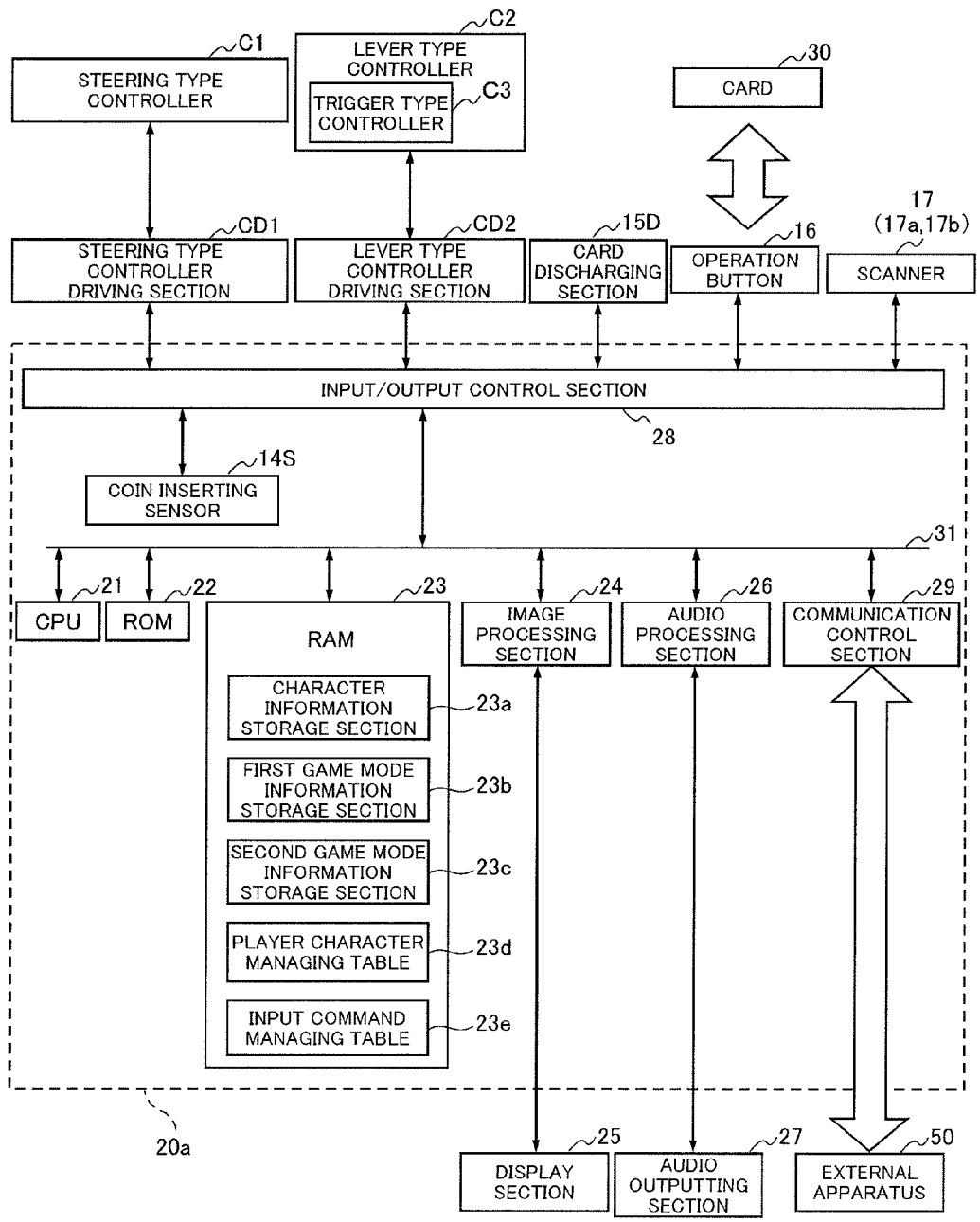
FIG. 4 is a block diagram showing an example of a circuit configuration of the arcade video game machine.

FIG. 4 is a block diagram showing an example of a circuit configuration of the arcade video game machine 10. As shown in FIG. 4, in the arcade video game machine 10, a control circuit (computer apparatus) 20a is contained within a shield case 20. The control circuit 20a includes a CPU 21, a ROM 22, a RAM 23, an image processing section 24, an audio processing section 26, an audio outputting section 27, an input/output control section 28, and a communication control section 29.

The CPU 21 has a function to carry out a video game processing program stored in the ROM 22 and a function to carry out various kinds of controls for causing the video game provided in the arcade video game machine 10 to proceed in response to an operation of the player. In this regard, the CPU 21 includes an internal timer.

The video game processing program carried out by the CPU 21, and various kinds of data that are not changed in accordance with progress of the video game are stored in the ROM 22. The RAM 23 is used as a work area for the CPU 21, and data that are changed in accordance with progress of the video game are stored in the RAM 23.

The image processing section 24 is connected to a display section 25, and causes the display section 25 to display a game screen according to progress of the video game and/or an operation of the player in accordance with a control of the CPU 21. The display section 25 is configured by a liquid crystal display, for example. In this regard, in the present embodiment, the case where one display screen is provided in the arcade video game machine 10 will be described as an example. For that reason, the display device 13 is the same as the display section 25. Therefore, hereinafter, explanation using the display section 25 will be provided.

The audio processing section 26 is connected to the audio outputting section 27, and causes the audio outputting section 27 to output an audio in accordance with a control of the CPU 21 in response to progress of the video game and an operation of the player.

The input/output control section 28 is connected to each of a coin inserting sensor 14S; the steering type controller driving section CD1; the lever type controller driving section CD2; the player operation button 16; a scanner 17 (scanners 17a, 17b); and a card discharging section 15D for discharging cards stacked on a card stacker (not shown in the drawings) from the card discharge port 15. The coin inserting sensor 14S detects insertion of a coin from the coin slot 14. The steering type controller driving section CD1 includes a sensor (not shown in the drawings) for detecting a state of the steering type controller C1. Further, the lever type controller driving section CD2 includes a sensor (not shown in the drawings) for detecting a state of the lever type controller C2.

Various kinds of signals including a detected signal of the coin inserting sensor 14S, an input signal of the player operation button 16, a signal indicating data read out from the card by the scanner 17, a detected signal that the steering type controller C1 moves to the predetermined position, and a detected signal that the lever type controller C2 moves to the specific position are inputted into the CPU 21 via the input/output control section 28. Further, the instruction to cause the lever type controller C2 to move to the specific position, and the instruction to cause the steering type controller C1 and the lever type controller C2 to move to the respective initial positions are transmitted to the respective driving sections (that is, the steering type controller driving section CD1 and the lever type controller driving section CD2) from the CPU 21 via the input/output control section 28.

The communication control section 29 is connected to other apparatus (an external apparatus) 50, and controls transmission and reception of information to and from the connected other apparatus 50. The other apparatus 50 connected to the communication control section 29 may be another arcade video game machine that has the same configuration as the arcade video game machine 10. The other arcade video game machine thus connected may be placed adjacent to the arcade video game machine 10, and may be connected to the arcade video game machine 10 via a dedicated line. Alternatively, the other arcade video game machine thus connected may be placed at a remote location, and may be connected to the arcade video game machine 10 via a communication line such as a telephone line or the Internet. Further, the other apparatus 50 connected to the communication control section 29 may be a management computer for a video game arcade in which the arcade video game machine 10 is placed or the like. In this regard, the CPU 21, the ROM 22, the RAM 23, the image processing section 24, the audio processing section 26, the input/output control section 28, and the communication control section 29 are connected to each other via an internal bus 31. Further, the configuration of the arcade video game machine 10 is not limited to this configuration. For example, the arcade video game machine 10 may be configured so that various kinds of data such as data that are changed in accordance with progress of the video game are stored in an external storage device (information memory).

In the arcade video game machine 10 according to an example of the present embodiment, in order to select a player character that is to participate in a video game and fight an enemy character, a card on which information on characters that can be selected as the player character is written is used. Some cards of a plurality of cards are provided as basic cards separately from execution of the video game. Further, when a coin is inserted in order to newly carry out a video game, one piece of new card is provide. In this regard, the arcade video game machine 10 may be configured so that the player character that the player can select even though the player has no card is set up.

Next, a card used in the arcade video game machine 10 according to an example of the present embodiment will be described. Display indicating character information regarding a name of a character and a status, and code data are drawn on a card 30. In this regard, in a case of the present embodiment, any one kind of player character of plural kinds of characters that can be cause to participate in the video game as the player character is drawn on per one piece of card. When the scanner 17a reads out the code data, the character drawn on the card 30 appears in the video game as the player character.

Further, in the present embodiment, the code data, by which information on the player character at the vehicle form and information on the player character at a battle form different from the vehicle form (for example, the animal form or the humanoid robot form) can be specified, are drawn on one piece of card.

In this regard, the code data are obtained by coding data for uniquely identifying the card 30. The card used in the present embodiment contains, in addition to the data indicating the character information as described above, code data indicating an item by which an offensive power of the player character is raised and an item by which the content of the command is changed, for example.

Next, "ultrarapid transformation" that is a feature of the video game carried out in the arcade video game machine 10 will be described. The "ultrarapid transformation" according to the present embodiment denotes a video game system in which the player character that finishes driving the course with the vehicle form transforms the vehicle form into the battle form (hereinafter, referred to as a "robot form") and the player character starts to battle against an enemy character transformed into the robot form. Hereinafter, processing from the time when three player characters constituting a team of the player (that is, each character having the vehicle form and the robot form, arbitrarily referred to as a "machine") and three machines constituting an enemy team (the enemy may be other player or a computer. Hereinafter, the machine at the enemy side is referred to as an "enemy character" or "enemy machine") go down to a battle map to the time when information on the battle such as a technique (or skill: action) of each machine and EP (that is, Energy Point: the video game is over when the point becomes zero) of the whole team is displayed denotes "ultrarapid transformation" or "ultrarapid transformation processing".

The arcade video game machine 10 is characterized in that a game mode before the ultrarapid transformation (that is, a game mode in which the player character with a vehicle form drives on a predetermined course in accordance with an operation of the steering C1 by the player: a drive mode) and a game mode after the ultrarapid transformation (that is, a game mode in which the player character with a robot form battles against an enemy character in accordance with an operation of the gyro lever C2 by the player: a battle mode) are different game modes (in particular, a game mode in which a genre and a controller to be used are different from each other). In the present embodiment, the "drive mode" is called a "first game mode", and the "battle mode" is called a "second game mode" arbitrarily, whereby the respective modes are distinguished.

Next, an example of various kinds of data (information) stored in the RAM 23 will be described.

In the present embodiment, the RAM 23 includes a character information storage section 23a; a first game mode information storage section 23b; a second game mode information storage section 23c; a player character managing table 23d; and an input command managing table 23e.

The character information storage section 23a is a storage area for storing the character information that is information regarding at least one kind of character. The character information contains information indicating a form of each character in the first game mode and a form of each character in the second game mode.

FIG. 5 is an explanatory drawing showing an example of a storage state of the character information stored in the character information storage section 23a. As shown in FIG. 5, the character information contains: a character ID; various kinds of information on a character in the first game mode; and various kinds of information on a character in the second game mode. More specifically, the character information contains information for specifying a driving form of the character in the first game mode (in the present embodiment, referred to as a "vehicle form" because the character is only a "vehicle") and driving performance. Further, the character information contains information for specifying a battle form of the character in the second game mode, battle performance, and an action of the character (in the present embodiment, "technique") that is carried out in response to an instruction (battle command) inputted using the shuttle lever C2. In this regard, in the present embodiment, the case where a robot form, for example, a humanoid robot form is adopted as the battle form will be described as an example. In this case, the battle form is not limited to the humanoid robot form. The battle form may be a form different from the form in the first game mode. However, it is preferable to adopt a form by which the player is caused to easily recognize that operability for the form, such as an animal form or an airplane form, is different from that for the vehicle form. Further, it is preferable to adopt a form by which the player is caused to easily recognize that the form is transformed from the vehicle form by setting up the same color (or the like) as that of the vehicle form.

In this regard, in the present embodiment, the case where the video game is carried out using a character having a vehicle form and a robot battle form will be described as an example. However, a form of the operational object in the first game mode may be the same as that in the second game mode, but the controllers used by the player may be configured so as to be different from each other.

In the present embodiment, in the battle mode, the player character carries out, in accordance with the instruction content by the shuttle lever C2, any of a "normal attack" set up as a general (safe) attack, a "burst attack" set up as a more powerful attack than the normal attack, and a "counter attack" set up as a more powerful attack than the normal attack carried out only in a case where an attack instructed for the other side is a burst attack. In this regard, in the present embodiment, the arcade video game machine 10 is configured so that the normal attack is carried out when the right gyro lever C2, when viewed from the front face, is pressed into, the burst attack is carried out when the left gyro lever C2 is pressed into, and the counter attack is carried out when both the gyro levers C2 are pressed into almost at the same time.

Each of the first game mode information storage section 23b and the second game mode information storage section 23c is a storage area for storing various kinds of information necessary for carrying out each of the game modes. In this regard, the arcade video game machine 10 may be configured so that the information on the "ultrarapid transformation" is stored in at least one of the first game mode information storage section 23b and the second game mode information storage section 23c. Alternatively, the arcade video game machine 10 may be configured so that the information on the "ultrarapid transformation" is stored in other storage area. Further, the arcade video game machine 10 may be configured so that each piece of information is stored in one storage area (game information memory).

FIG. 6 is an explanatory drawing showing an example of a storage state of the second game mode information stored in the second game mode information storage section 23c. Here, as an example of the game information, correlation information of the "technique" contained in the second game mode information will be described as an example. In the present embodiment, the correlation information is information indicating the content of "technique". The "technique" is an action that each character is caused to carry out in accordance with a combination of an instruction, which can be inputted using the gyro lever C2, and the content, which can be instructed to an enemy character (that is, an instruction that can be inputted by other player in a case where the enemy is the other player).

As shown in FIG. 6, the correlation information is configured so that the content of "techniques" carried out by the player character and the enemy character is determined in accordance with the content of an instruction by the player and the content of an instruction by the enemy. Namely, for example, in a case where the player instructs a "normal attack" and the enemy (that is, a match-up player or computer) instructs a "normal attack", each character carries out the "normal attack" each other. In a case where the player instructs a "counter attack" and the enemy instructs the "normal attack", a character of the player (that is, the player character) carries out an attack weaker than the "counter attack" and the "normal attack" (that is, counter failure), and only a character of the enemy carries out the "normal attack". Further, in a case where one instructs the "counter attack" and the other instructs a "burst attack", the character of the one party carries out the "counter attack" as a "burst break", and the character of the other party does not carry out the "burst attack" (that is, action impossible).

The player character managing table 23d is a storage area in which information regarding a character (the player character) specified by the player as the character to be operated among the character information is registered. The arcade video game machine 10 updates the character information registered in the player character managing table 23d in accordance with progress of the video game correspondingly.

The input command managing table 23e is a storage area in which an instruction (input command) inputted using each of the controllers is registered. In the present embodiment, in the battle mode, development of the video game thereafter is determined in accordance with the input command registered in the input command managing table 23e. The processing carried out at the battle mode will be described later in detail (see FIGS. 12 and 14).

Next, an operation of the arcade video game machine 10 according to the present embodiment will be described.

Figure 7:
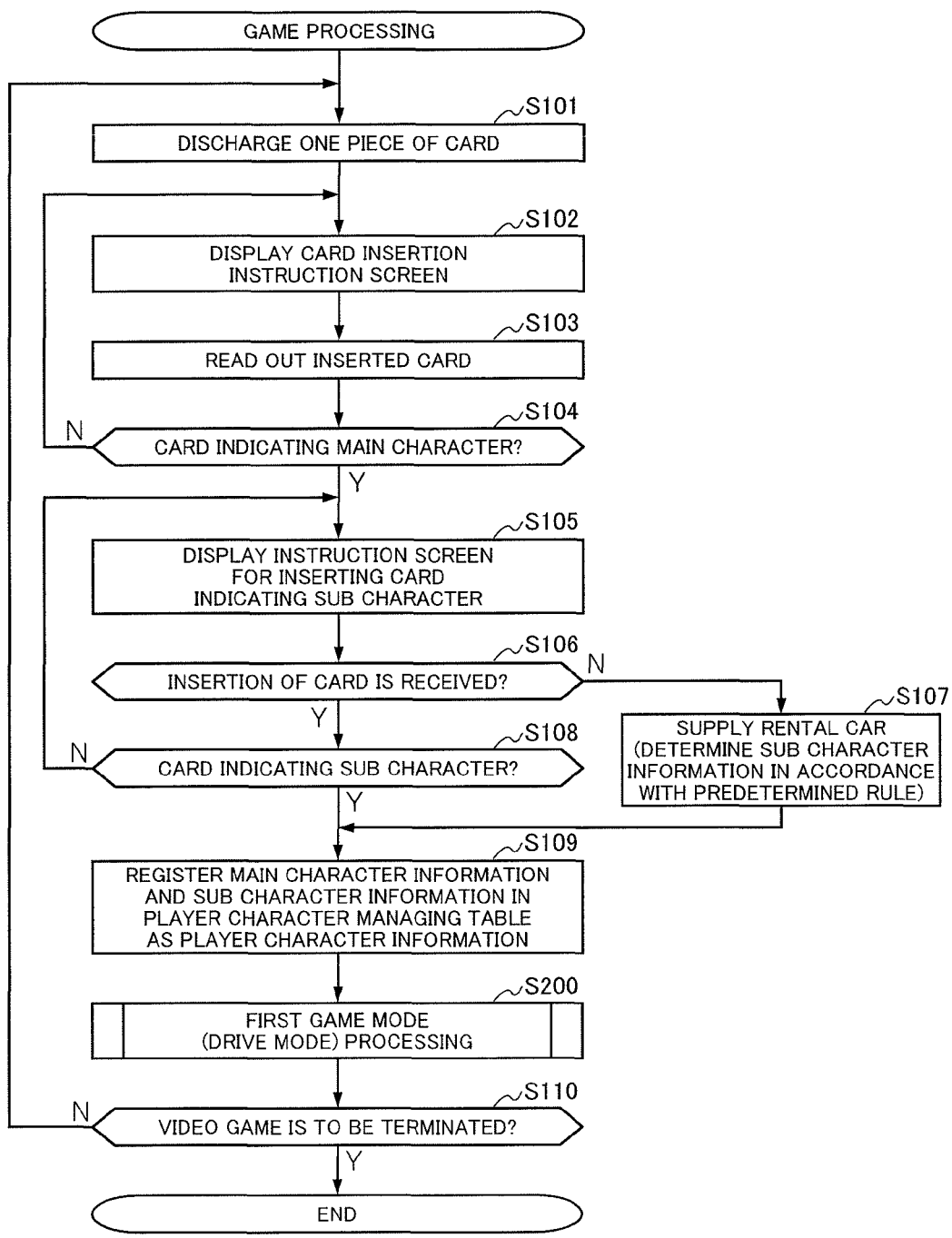
FIG. 7 is a flowchart showing an example of game processing.

FIG. 7 is a flowchart showing an example of game processing carried out by the arcade video game machine 10. The game processing is started when the coin inserting sensor 14S detects that a coin is dropped from the coin slot 14. In the game processing according to the present embodiment, processing from the time when a player 1 determines a player character that becomes his or her operational object to the time when a video game is terminated is carried out. In this regard, the content of processing with no relationship to the present invention may be omitted.

The CPU 21 first controls the card discharging section 15D to discharge a piece of card 30 from the cards 30 stacked in the card stacker (Step S101).

Next, the CPU 21 transmits an instruction to the image processing section 24, and causes the display section 25 to display a screen (card insertion instruction screen) for instructing the player to insert one piece of card 30 held by the player into a card insertion slot 17R (Step S102).

When the card 30 is inserted into the card insertion slot 17R by the player, the CPU 21 causes the scanner 17a to read out code data stored in the card 30 (Step S103).

When the scanner 17a is caused to read out the code data, the CPU 21 determines whether the inserted card 30 is a card indicating a main character or not (Step S104). Here, for example, in a case where the code data indicates an item, the CPU 21 determines that the card 30 is not the card indicating the main character ("No" at Step S104), and causes the processing flow to shift to the process at Step S102. In this regard, the arcade video game machine 10 may be configured so that, at this time, the CPU 21 determines, in accordance with a predetermined rule, information on a character that is to be the main character (main character information) among the character information stored in the character information storage section 23a and causes the processing flow to shift to a process at Step S109 (will be described later).

On the other hand, in a case where the code data indicates a character, the CPU 21 determines that the card 30 is a card indicating the main character ("Yes" at Step S104); transmits an instruction to the image processing section 24; and causes the display section 25 to display an instruction screen for inserting a card indicating a sub character (Step S105).

Subsequently, the CPU 21 determines whether insertion of a card is received or not (Step S106). Here, in a case where it is determined that the insertion of the card is not received because, for example, the player receives a selection operation, which specifies that a card is not inserted ("No" at Step S106), the CPU 21 carries out processing set up in advance as "processing to supply a rental car" (Step S107). More specifically, the CPU 21 determines, in accordance with a predetermined rule, information on a character that is to be the sub character (sub character information) among the character information stored in the character information storage section 23a, and causes the processing flow to shift to a process at Step S109 (will be described later).

On the other hand, in a case where it is determined that the insertion of the card is received ("Yes" at Step S106), the CPU 21 determines whether the inserted card is a card indicating the sub character or not (Step S108). Here, in a case where it is determined that the inserted card is not the card indicating the sub character ("No" at Step S108), the CPU 21 causes the processing flow to shift to the process at Step S105.

On the other hand, in a case where it is determined that the inserted card is the card indicating the sub character because, for example, the inserted card is a card indicating a character different from the main character ("Yes" at Step S108), the CPU 21 reads out information indicating the main character (main character information) and the sub character information from the character information storage section 23a, and registers them in the player character managing table 23d (Step S109).

When the character information is registered, the CPU 21 starts the first game mode processing for controlling progress of the video game on the basis of the first game mode (Step S200).

Figure 8:
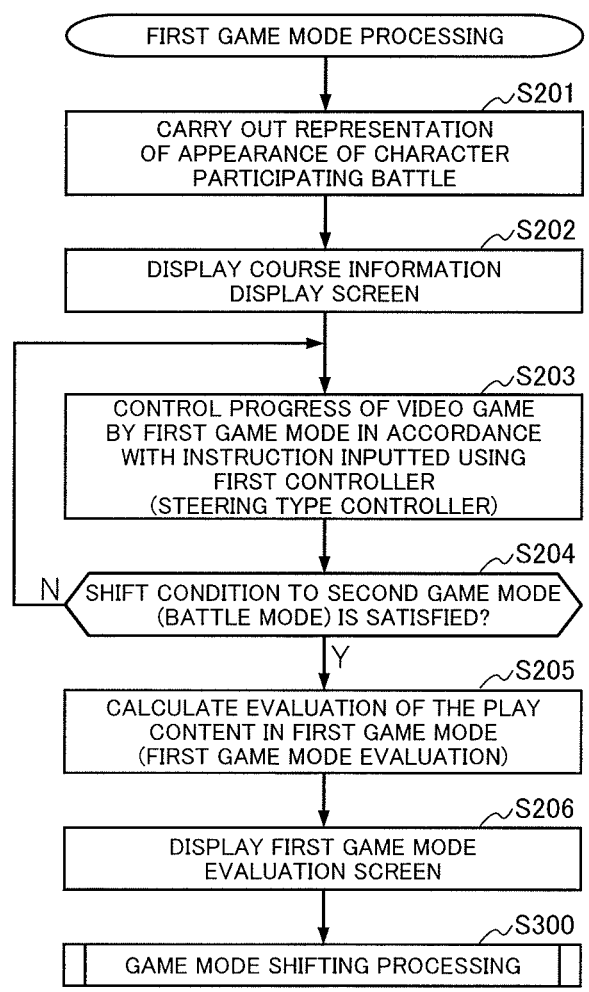
FIG. 8 is a flowchart showing an example of first game mode processing.

FIG. 8 is a flowchart showing an example of the first game mode processing carried out by the arcade video game machine 10 according to the present embodiment. In the first game mode processing, processing to control progress of the video game in the first game mode in accordance with an instruction inputted using the first controller is carried out. In this regard, the content of processing with no relationship to the present invention may be omitted.

When the first game mode processing is started, the CPU 21 refers to the first game mode information storage section 23b to carry out processing for representation of appearance of a character participating a battle (or representation of appearance of a machine participating a battle) (Step S201). In the present embodiment, the CPU 21 transmits an instruction to the image processing section 24, and carries out processing to cause the display section 25 to display a game screen including the player character, which is indicated by the character information registered in the player character managing table 23d (the first game mode screen) and the like.

Subsequently, the CPU 21 transmits an instruction to the image processing section 24, and causes the display section 25 to display a course information display screen (Step S202). In the course information display screen, information on a course on which the player character with a vehicle form drives is displayed.

When the display section 25 is caused to display the course information display screen, the CPU 21 controls progress of the video game in the first game mode in accordance with an instruction inputted using the steering C1 (Step S203). In the present embodiment, the CPU 21 causes the display section 25 to display an action (for example, drift or the like) according to a course status, which includes a traveling direction of a main character with a vehicle form in accordance with a rotation angle of the steering C1. In this regard, in the present embodiment, the main character (main machine) is controlled so as to accelerate regardless of an instruction by the player, and the CPU 21 determines a speed of the main character in accordance with a deceleration or boost (ultra acceleration) operation on the basis of an operation of the shift lever 18. Further, an action of the sub character is to be controlled so as to follow the main character.

Figure 9:
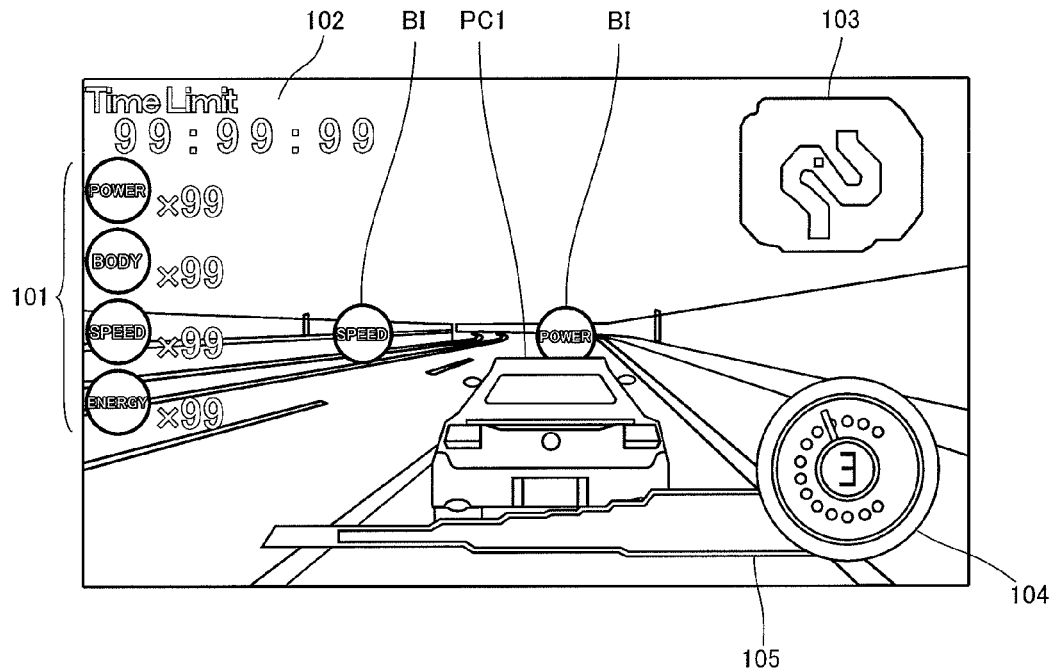
FIG. 9 is an explanatory drawing showing an example of a first game screen.

FIG. 9 is an explanatory drawing showing an example of the game screen (first game screen) when the video game proceeds on the basis of the first game mode. As shown in FIG. 9, a bonus item BI arranged on the course (hereinafter, referred to as an "item"); an item acquired number display region 101 indicating the number of acquired items by the player 1; a time limit display region 102; a course outline display region 103; a player character PC1 as a main character; and an EP display region 105 for displaying a total EP of the main character PC1 and two sub characters PC2, PC3 (not shown in the drawings) are provided in a first game screen. In this regard, in the present embodiment, the total EP is displayed in a gauge form (that is, a form in which the amount of EP is indicated by increase or decrease of a meter in a gauge) in the EP display region 105.

In conjunction with control of the progress of the first game mode, the CPU 21 determines whether a shift condition to the second game mode is satisfied or not (Step S204). Here, the CPU 21 continues progress of the video game in the first game mode until it is determined that a shift condition set up in advance is not satisfied ("No" at Step S204). Here, in the present embodiment, as the shift condition to the second game mode (second game mode shift condition), "any one of a condition that the player character runs out the course and a condition that a predetermined period of time elapses since the player character starts driving is satisfied" is set up. In this regard, the second game mode shift condition is not limited to this condition. For example, the second game mode shift condition may be a condition independent of progress of the video game in the first game mode (for example, a condition "a predetermined force termination button is pressed", a condition "a specific period of time elapses until the video game is started" or the like). Namely, the arcade video game machine 10 may be configured so that the CPU 21 determines a condition independently of a control result in the first game mode. Further, in the present embodiment, the shift condition to the second game mode is stored in the first game mode information storage section 23b as the first game mode information.

On the other hand, in a case where it is determined that the shift condition to the second game mode is satisfied because, for example, the player character terminates driving of the course ("Yes" at Step S204), the CPU 21 calculates evaluation of the content of play in the first game mode (the first game mode evaluation) (Step S205). In the present embodiment, the CPU 21 calculates a numerical value as the first game mode evaluation using a predetermined computational expression that utilizes a clear time of the course and the number of acquired items. In this regard, the CPU 21 registers the calculated first game mode evaluation in the player character managing table 23d, and causes the display section 25 to display a first game mode evaluation screen (Step S206).

Subsequently, the CPU 21 carries out game mode shifting processing for shifting the game mode from the first game mode to the second game mode (Step S300).

Figure 10:
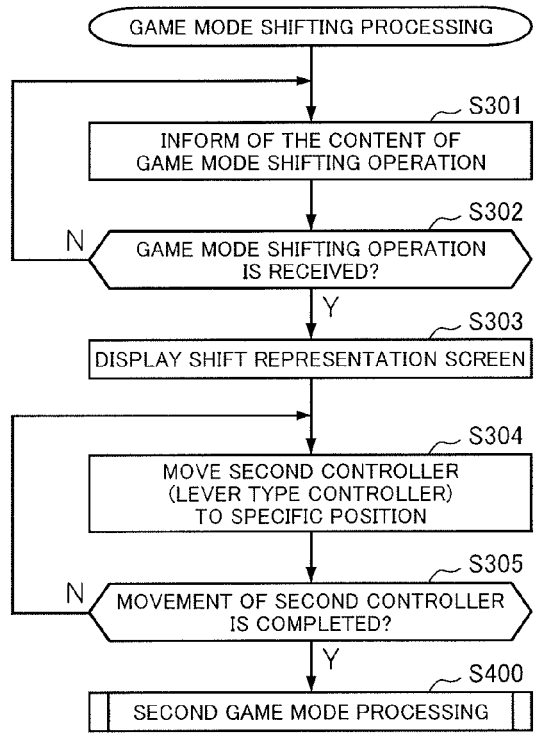
FIG. 10 is a flowchart showing an example of game mode shifting processing.

FIG. 10 is a flowchart showing an example of game mode shifting processing carried out by the arcade video game machine 10 according to the present embodiment. In this regard, the content of processing with no relationship to the present invention may be omitted.

When the game mode shifting processing is started, the CPU 21 informs the player 1 of the content of a game mode shifting operation, which is an operation for shifting the ongoing game mode (Step S301). In the present embodiment, the CPU 21 outputs an audio for announcement "push up the steering to set up the ultrarapid transformation", for example. In this regard, a method of informing such announcement is not particularly limited. For example, the arcade video game machine 10 may be configured so that the display section 25 is caused to display a screen for informing a player of the content of the game mode shifting operation.

When the player 1 is informed of the content of the game mode shifting operation, the CPU 21 determines whether the game mode shifting operation is received or not (or whether the game mode shifting operation is detected or not) (Step S302). Here, in a case where it is determined that the game mode shifting operation is received on the basis of notification from the steering type controller driving section CD1 ("Yes" at Step S302), the CPU 21 transmits an instruction to the image processing section 24, and causes the display section 25 to display a shift representation screen for informing the player 1 of shift (or transition) of the game mode (Step S303).

When the display section 25 is caused to display the shift representation screen, the CPU 21 transmits an instruction to the lever type controller driving section CD2, and causes the second controller (lever type controller, or gyro lever) C2 to move to a specific position (Step S304).

Then, in a case where it is determined that the movement of the second controller is completed ("Yes" at Step S305), the CPU 21 starts the second game mode processing to control progress of the video game by the second game mode (Step S400). In this regard, in the present embodiment, the CPU 21 determines that the movement of the second controller is completed in a case where the second controller is moved to the specific position and the CPU 21 receives, from the lever type controller driving section CD2, a notification that the second controller is fixed.

Figure 11:
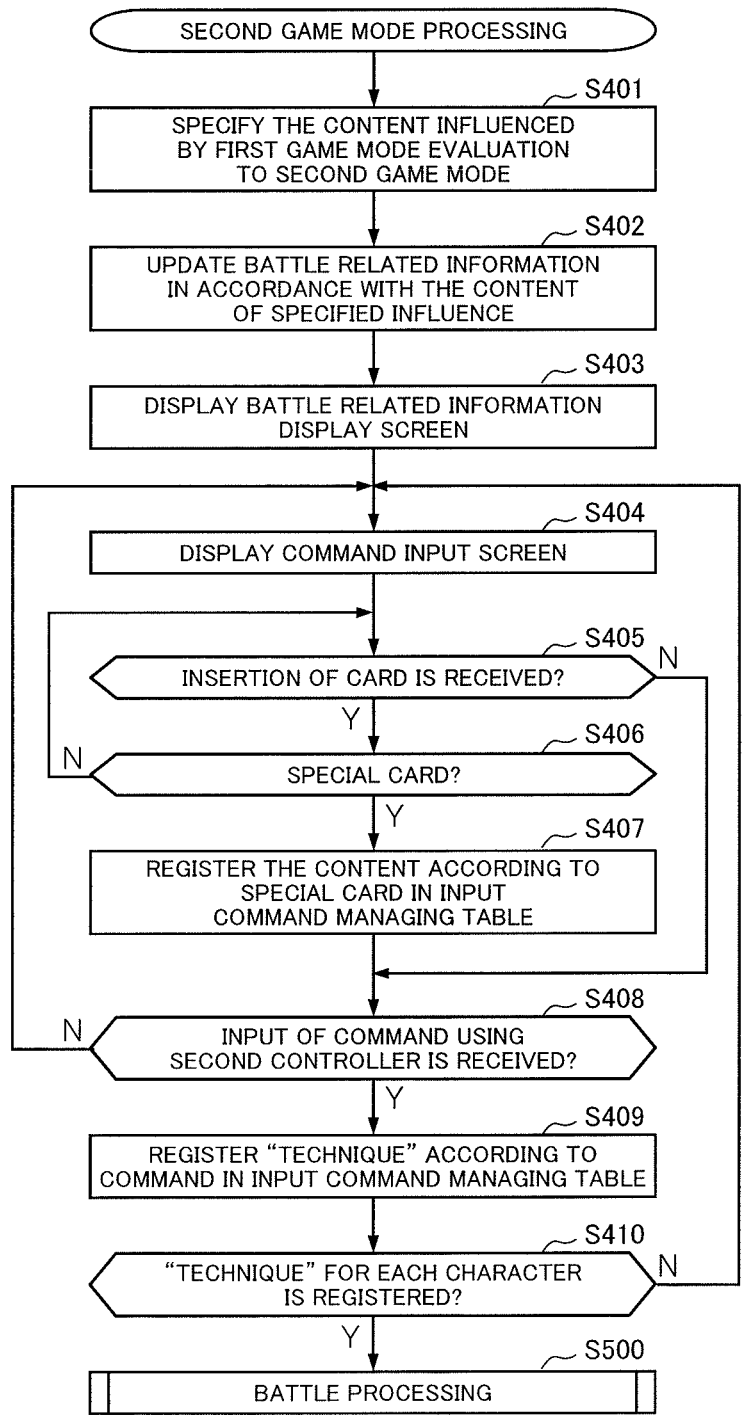
FIG. 11 is a flowchart showing an example of second game mode processing.

FIG. 11 is a flowchart showing an example of second game mode processing carried out by the arcade video game machine 10 according to the present embodiment. In the second game mode processing, processing to control progress of the video game in the second game mode in accordance with an instruction inputted using the second controller different from the first controller is carried out. In this regard, the content of processing with no relationship to the present invention may be omitted.

In the second game mode processing, the CPU 21 first specifies the content influenced (the content of influence) by the first game mode evaluation to the second game mode (Step S401). In the present embodiment, the CPU 21 specifies a changed value of a status of the character in accordance with a rule stored in the second game mode information storage section 23c.

When the content of influence is specified, the CPU 21 updates battle related information in accordance with the content of influence thus specified (Step S402). Here, the "battle related information" is information related to a battle between the player character with a battle form and an enemy character, and contains an offensive power of each character, EP and the like, for example. In the present embodiment, the CPU 21 updates the information registered in the player character managing table 23d in order to raise the status of the player character as the item bonus. Thus, the CPU 21 reflects the result of progress of the video game in the first game mode into progress of the video game in the second game mode.

When the battle related information is updated, the CPU 21 transmits an instruction to the image processing section 24, and causes the display section 25 to display a battle related information display screen for presenting the battle related information to the player 1 (Step S403).

When the display section 25 is caused to display the battle related information display screen, the CPU 21 transmits an instruction to the image processing section 24 in accordance with elapse of a predetermined period of time, for example, and causes the display section 25 to display a command input screen for encouraging the player 1 to input a command (Step S404).

Figure 12:
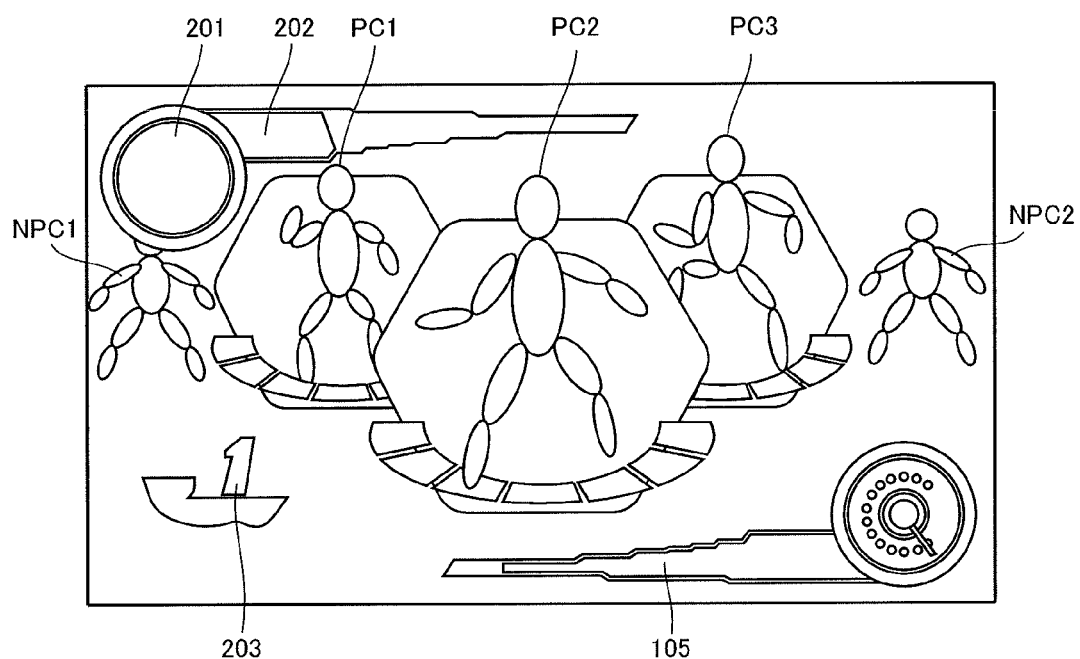
FIG. 12 is an explanatory drawing for explaining an example of a command input screen.

FIG. 12 is an explanatory drawing showing an example of the command input screen. As shown in FIG. 12, the player characters (that is, the main character PC1 and the two sub characters PC2, PC3) that become input targets of commands (that is, target for which "technique" to be carried out is set up); enemy characters NPC1, NPC2; an enemy icon display region 201 for displaying an icon of each enemy character; an enemy EP display region 202 for displaying a total EP of all the enemy characters in the form of a gauge; and a battle turn number display region for displaying the number of battle turns are provided in the command input screen. Here, the "battle turn" denotes the number of times of technique sequence carried out after an input of a command. In a case where the number of battle turns is "1", this means a first input of a command in a battle.

When the display section 25 is caused to display the command input screen, the CPU 21 determines whether insertion of a card is received or not (Step S405). Here, in a case where it is determined that insertion of the card is not received ("No" at Step S405), the CPU 21 causes the processing flow to shift to a process at Step S408 (will be described later).

On the other hand, in a case where it is determined that insertion of the card is received ("Yes" at Step S405), the CPU 21 determines whether the received card is a special card in which an effect to assist a battle is set up or not (Step S406). Here, in a case where it is determined that the received card is not the special card ("No" at Step S406), the CPU 21 determines that the insertion of the card is invalid, and causes the processing flow to return to the process at Step S405.

On the other hand, in a case where it is determined that the received card is the special card ("Yes" at Step S406), the CPU 21 registers the content according to the special card in the input command managing table 23e (Step S407). In this regard, in the present embodiment, the CPU 21 registers, in response to the situation that the trigger C3 is pulled after the special card is inserted, the content according to the inserted special card in the input command managing table 23e. Further, in a case where two players carry out a video game using one arcade video game machine 10, the CPU 21 registers the content according to the inserted special card in the input command managing table 23e for the player corresponding to the pulled trigger C3.

Subsequently, the CPU 21 determines whether an input of a command using the second controller C2 is received or not (Step S408). Here, in a case where it is determined that the input of the command using the second controller C2 (that is, an instruction by the player 1) is received ("Yes" at Step S408), the CPU 21 refers to the player character managing table 23d, and registers a "waza (i.e., technique)" according to the received command in the input command managing table 23e (Step S409).

When the "technique" is registered in the input command managing table 23e, the CPU 21 determines whether any "technique" for each character is registered or not (Step S410). Namely, the CPU 21 determines whether any "technique" is registered for both the player character and the enemy character or not. Here, in a case where it is determined that a "technique" for each character is not registered ("No" at Step S410), the CPU 21 causes the processing flow to shift to the process at Step S404. In this regard, in the present embodiment, the content of the command input screen is updated in accordance with the character for which no "technique" is registered. Namely, in the command input screen, for example, the player character for which no "technique" is registered is distinguishably displayed.

On the other hand, in a case where it is determined that a "technique" for each character is registered ("Yes" at Step S410), the CPU 21 starts battle processing for realizing a battle between characters according to the inputted command (Step S500).

Figure 13:
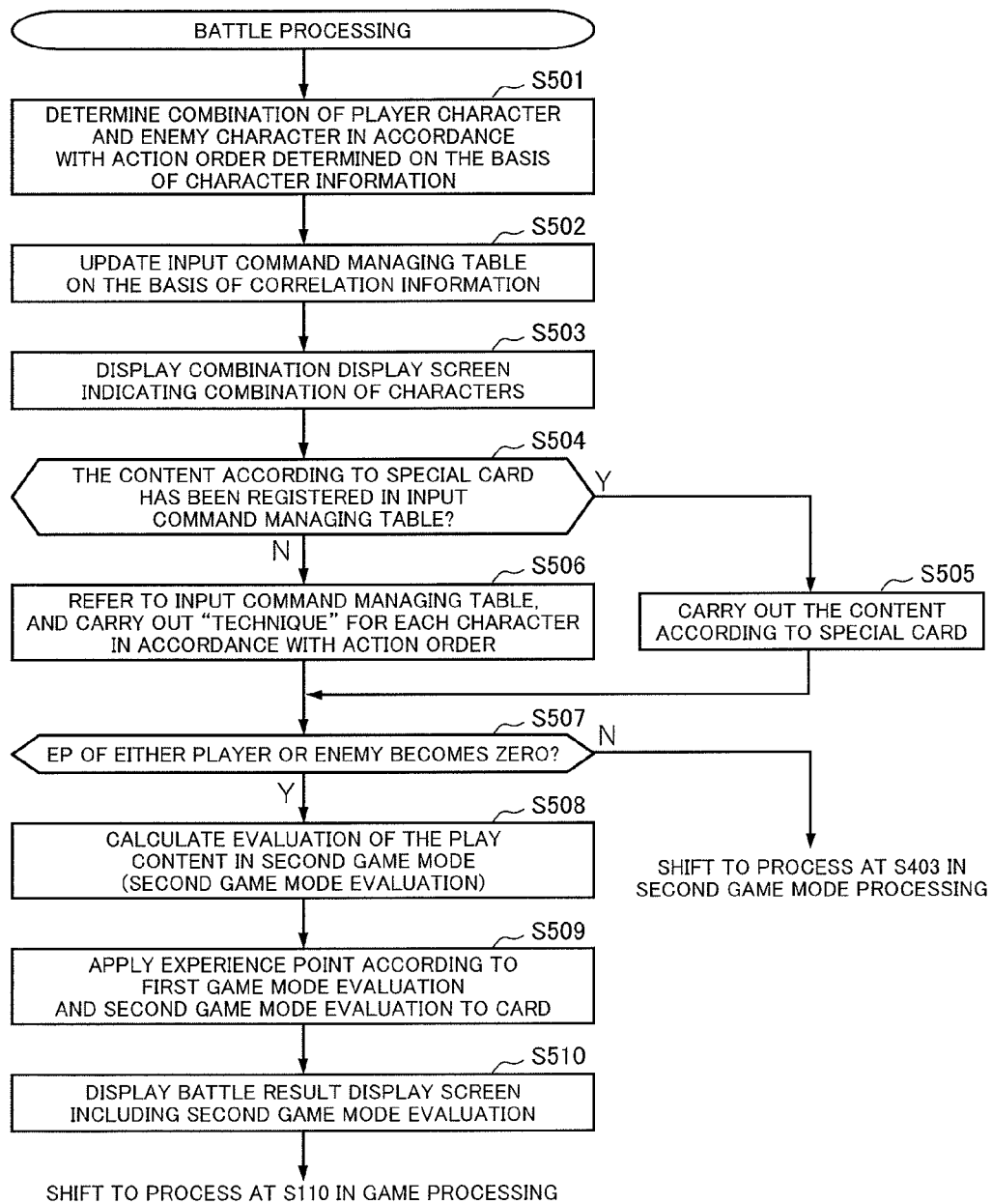
FIG. 13 is a flowchart showing an example of battle processing.

FIG. 13 is a flowchart showing an example of battle processing carried out by the arcade video game machine 10 according to the present embodiment. In this regard, the content of processing with no relationship to the present invention may be omitted.

In the battle processing, the CPU 21 first determines a combination of the player character and an enemy character in accordance with an action order determined on the basis of the character information (Step S501). In the present embodiment, the CPU 21 determines an action order of each character in a predetermined method in which a random number is added to a speed of each of all characters that participate in the battle, and then, combine the player character with an enemy character that has an action order closest with the action order of the player character.

When the combination of the characters is determined, the CPU 21 updates the input command managing table 23e on the basis of the correlation information (see FIG. 6) (Step S502).

When the input command managing table 23e is updated on the basis of the correlation information (that is, when a "technique" carried out in accordance with the combination of the respective characters is determined), the CPU 21 transmits an instruction to the image processing section 24, and causes the display section 25 to display a combination display screen indicating a combination of the characters (Step S503).

Subsequently, the CPU 21 determines whether or not the content according to the special card has been registered in the input command managing table 23e for the player or the enemy (Step S504). Here, in a case where it is determined that the content according to the special card has been registered ("Yes" at Step S504), the CPU 21 carries out processing in accordance with the registered content (the content according to the special card) (Step S505), and causes the processing flow to shift to a process at Step S507 (will be described later).

On the other hand, in a case where it is determined that the content according to the special card has not been registered ("No" at Step S504), the CPU 21 refers to the input command managing table 23e, and carries out the "technique" for each character in accordance with the action order (Step S506).

Then, after the "technique" for one character is carried out or after the "techniques" for all characters are carried out, the CPU 21 determines whether the EP of either the player or the enemy becomes zero (0) or not (Step S507). Here, in a case where it is determined that the EPs of both the player and the enemy do not become zero ("No" at Step S507), the CPU 21 causes the processing flow to shift to the process at Step S403 in the second game mode processing.

On the other hand, in a case where it is determined that the EP of either the player or the enemy becomes zero ("Yes" at Step S507), the CPU 21 calculates evaluation of the player in the second game mode (second game mode evaluation) on the basis of calculation standard set up in advance (Step S508).

When the second game mode evaluation is calculated, the CPU 21 applies an experience point according to the first game mode evaluation and the second game mode evaluation to the card indicating the main character (or the card in which the user information is registered) (Step S509). In this regard, a method of applying the experience point is not particularly limited. The arcade video game machine 10 may be configured so as to write data to the card. Alternatively, the arcade video game machine 10 may be configured to manage the card so as to associate identification information indicated by the card with the experience point.

When the experience point is applied to the card, the CPU 21 transmits an instruction to the image processing section 24, and causes the display section 25 to display a battle result display screen including the second game mode evaluation (Step S510).

When the battle result display screen is caused to display, the CPU 21 causes the processing flow to shift to the process at Step S110 in the game processing (see FIG. 7). In the process at Step S110 in the game processing, the CPU 21 determines whether the video game is to be terminated or not (Step S110). A method of determining termination of the video game is not particularly limited. For example, it may be configured so that the CPU 21 transmits an instruction to the image processing section 24 and the display section 25 is caused to display a continue screen for confirming the intention of the player.

Although the arcade video game machine 10 has been described as an example in the embodiment described above, it is possible to apply the content of the video game to other video game processing apparatuses such as a home-use video game machine and a mobile video game machine.

As explained above, in the embodiment described above, the video game processing apparatus (for example, the arcade video game machine 10) for controlling progress of the video game by displaying an operational object (for example, the player character) operated by a player on a display screen, the progress of the video game containing a fight against an enemy character is configured so as to: include the game information memory (for example, the first game mode information storage section 23b and the second game mode information storage section 23c) for storing game information on the first game mode (for example, the drive mode) and the second game mode (for example, the battle mode) for the video game, the second game mode being a game mode different from the first game mode; receive the video game start request (for example, insertion of a coin) from the player 1; control progress of the video game in the first game mode in accordance with an instruction inputted using the first controller (for example, the steering type controller C1) in a case where the video game start request receiver receives the video game start request; determine whether the predetermined condition (for example, the second game mode shift condition) is satisfied or not (for example, Step S204); induce the player 1 to carry out a game mode shifting operation in a case where it is determined that the predetermined condition is satisfied, the game mode shifting operation being an operation set up as the operation to shift the game mode (for example, Step S301); receive the game mode shifting operation by the player 1; cause the second controller (for example, the lever type controller C2) to move from the storage state to the exposed state in a case where the game mode shifting operation receiver receives the game mode shifting operation; and controlling progress of the video game in the second game mode (for example, the battle mode) in accordance with an instruction inputted using the second controller in a case where the second controller mover causes the second controller to move to the exposed state. Therefore, it is possible to provide a match-up type video game with rich variation, which can keep interest of a player in the video game.

Namely, the player can merely play the two battle modes, and the player is caused to use the different controllers for the respective modes. For that reason, it is useful to keep interest of the player in the video game. Further, since it is possible to give the player himself or herself a chance to move his or her body (exercise) as the game mode shifting operation, it becomes possible for the player to divert himself or herself effectively. In this regard, the arcade video game machine 10 may be configured so that the "predetermined condition" is a condition regarding a control result in the first game mode. By configuring the arcade video game machine 10 in this manner, it becomes possible to improve relevance between the plurality of game modes.

Further, in the embodiment described above, the video game processing apparatus (for example, the arcade video game machine 10) is configured so that the game mode shifting operation is an operation to cause a position of the first controller (for example, the steering type controller C1) to move to a predetermined evacuation position wherein the predetermined evacuation position does not lie in the way when to operate the second controller (for example, the lever type controller C2). Since the plurality of controllers are arranged in such a manner, it becomes possible to prevent operability of the respective controllers from being lowered. Further, it becomes possible to improve the degree of freedom of appearance design of the arcade video game machine.

Further, in the embodiment described above, the video game processing apparatus (for example, the arcade video game machine 10) is configured so that the first controller has a steering shape, the first game mode is the drive mode in which the player operates a vehicle, the second controller is a lever-shaped controller provided with a trigger, and the second game mode is a battle mode in which a robot operated by the player carries out a battle against the enemy character. Therefore, it is possible to provide a video game machine by which the player can play plural genres of video games as one machine (housing). Namely, conventionally, in particular, in the field of an arcade video game machine, a different controller is generally used depending upon a genre of a video game, there has thus been a problem that it is difficult to integrate the controller with a good usability. However, by configuring the plurality of controllers so that their arrangement can be changed, it is possible to solve such a problem.

Further, in the embodiment described above, the video game processing apparatus (for example, the arcade video game machine 10) is configured so as to: include the operational object information memory (for example, the character information storage section 23a) for storing operational object information, the operational object information containing information regarding at least one kind of the operational object (for example, the character), the information indicating a form in the first game mode (for example, the driving form) and a form in the second game mode (for example, the battle form); receive an input of card information, the card information containing identification information of the operational object; specify the operational object (for example, one main character and two sub characters) as the operational object of the player in each of the game modes on the basis of the received card information, the operational object indicating a predetermined number of pieces of operational object information among the operational object information stored in the operational object information memory (for example, specify the operational object by registering the character information in the player character managing table 23d); display the specified operational object on the display screen with a form according to each of the game mode; and reflect a result of progress of the video game in the first game mode (for example, the first game mode evaluation) to progress of the video game in the second game mode (for example, Step S402). Therefore, it is possible to correlate the different game modes with each other, and it becomes possible to improve interest of the player in the video game.

Further, in the embodiment described above, the arcade video game machine 10 is configured so that the game information (for example, the second game mode information) contains correlation information (see FIG. 6) that is information indicating the content of a process to be carried out in accordance with a combination of an instruction that can be inputted using the second controller in the second game mode and the content that can be instructed to the enemy character; and the video game processing apparatus (for example, the arcade video game machine 10) refers to the correlation information to determine the content of a process carried out in accordance with the instruction inputted using the second controller (for example, Step S502). Therefore, it becomes possible to entertain the player with consideration of move of the enemy.

In this regard, although it has not been mentioned particularly in the embodiment described above, the video game processing apparatus (for example, the arcade video game machine 10) may be configured so that in the battle processing (see FIG. 13), a burst power gauge increasing bonus is applied to the player when an operation of the gyro lever C2 or the trigger C3 is received timely at the moment of hit during a technique sequence (for example, during execution of the technique at Step S505). Further, in a case where the arcade video game machine 10 is configured in such a manner, the arcade video game machine 10 may be configured so that plural times of trigger timing are set up for the normal attack.

In this regard, in the embodiment described above, the video game processing apparatus (for example, the arcade video game machine 10) carries out various kinds of processings described above in accordance with the control program (for example, the video game processing program) stored in a storage device (the ROM 22) with which the video game processing apparatus itself is provided.

INDUSTRIAL APPLICABILITY

The present invention is useful to provide a match-up type video game with rich variation, which can keep interest of a player in the video game.

What is claimed is:

1. A video game processing apparatus for controlling progress of a video game by displaying an operational object operated by a player on a display screen, the progress of the video game containing a fight against an enemy character, the video game processing apparatus comprising:
a memory configured to store game information on a first game mode and a second game mode for the video game, the second game mode being different from the first game mode;
a receiver configured to receive a video game start request from the player;
a first controller configured to control the progress of the video game in the first game mode in accordance with an instruction inputted using a first controller when the video game start request receiver receives the video game start request;
a processor configured to determine whether a predetermined condition is satisfied,
to induce the player to carry out a game mode shifting operation when the predetermined condition is satisfied, to determine whether a game mode shifting operation is received from the player, and to cause a second controller to move from a storage state to an exposed state when the game mode shifting operation is received, the game mode shifting operation being an operation to shift a game mode;
and
the second controller configured to control the progress of the video game in the second game mode in accordance with an instruction inputted using the second controller when the processor causes the second controller to move to the exposed state,
wherein the second controller is different than the first controller, and
in the storage state, the second controller is unexposed to the player.

2. The video game processing apparatus according to claim 1, wherein the game mode shifting operation causes the first controller to move to a predetermined evacuation position, the predetermined evacuation position not being within an operational range of the second controller.

3. The video game processing apparatus according to claim 1,
wherein the first controller is a steering type controller,
the first game mode is a drive mode in which the player operates a vehicle,
the second controller is a lever type controller provided with a trigger, and
the second game mode is a battle mode in which a character operated by the player carries out a battle against the enemy character.

4. The video game processing apparatus according to claim 1, further comprising:
a card receiver configured to receive an input of card information, the card information containing identification information of the operational object; and
a display configured to display the operational object on a display screen with a form for each of the first game mode and the second game mode,
wherein the memory is further configured to store operational object information regarding at least one kind of the operational object, the operational object information indicating the form of the operational object in the first game mode and the form of the operational object in the second game mode,
the processor is configured to specify the operational object of the player in each of the first game mode and the second game mode on the basis of the card information received by the card receiver, the operational object indicating a predetermined number of pieces of the operational object information stored in the memory.

5. The video game processing apparatus according to claim 4,
wherein the processor applies an experience point of the game in the first mode and an experience point of the game in the second mode to the card information received by the card receiver.

6. The video game processing apparatus according to claim 1,
wherein the game information contains correlation information that is information indicating a content of a process to be carried out in accordance with a combination of an instruction that is inputted using the second controller in the second game mode and a content that is instructed to the enemy character, and
the second controller is configured to refer to the correlation information to determine the content of the process carried out in accordance with the instruction inputted using the second controller.

7. The video game processing apparatus according to claim 1,
wherein the processor applies an experience point of the game in the first mode to an experience point of the game in the second mode.

8. The video game processing apparatus according to claim 1,
wherein the second game mode is a battle based on results of the first game mode.

9. The video game processing apparatus according to claim 1,
wherein the processor is further configured to specify a content influenced by the first game mode to the second game mode.

10. The video game processing apparatus according to claim 9,
wherein the content influenced includes a changed value of a status of a player character operated by the player.

11. The video game processing apparatus according to claim 1,
wherein the processor is configured to determine whether the predetermined condition occurs based on the player finishing a driving course.

12. The video game processing apparatus according to claim 1,
wherein the processor is configured to determine whether the predetermined condition occurs based on a predetermined period of time elapsing.

13. The video game processing apparatus according to claim 1,
wherein the processor is configured to determine whether the predetermined condition occurs independently of a control result of the first game mode.

14. A non-transitory computer-readable medium including a video game processing program for controlling progress of a video game by displaying an operational object operated by a player on a display screen, the progress of the video game including a fight against an enemy character, the video game processing program causing a computer to execute:
receiving a video game start request from the player;
controlling the progress of the video game in a first game mode on the basis of game information stored in a memory in accordance with an instruction inputted using a first controller when the video game start request is received, the game information being related to the first game mode and a second game mode of the video game, the second game mode being different from the first game mode;
determining whether a predetermined condition is satisfied;
inducing the player to carry out a game mode shifting operation when the predetermined condition is satisfied, the game mode shifting operation being an operation to shift a game mode;
receiving the game mode shifting operation from the player;
causing a second controller to move from a storage state to an exposed state when the game mode shifting operation is received; and
controlling the progress of the video game in the second game mode in accordance with an instruction inputted using the second controller when the second controller is caused to move to the exposed state,
wherein the second controller is different than the first controller, and
in the storage state, the second controller is unexposed to the player.

* * * * *